July 29, 1930.  B. A. MITCHELL  1,771,807
TRANSMISSION DEVICE
Filed May 28, 1929  2 Sheets-Sheet 2
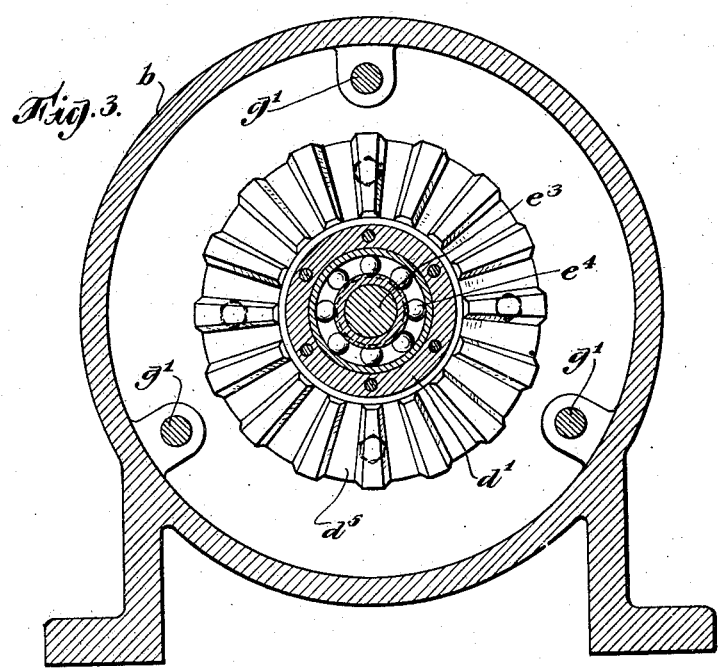
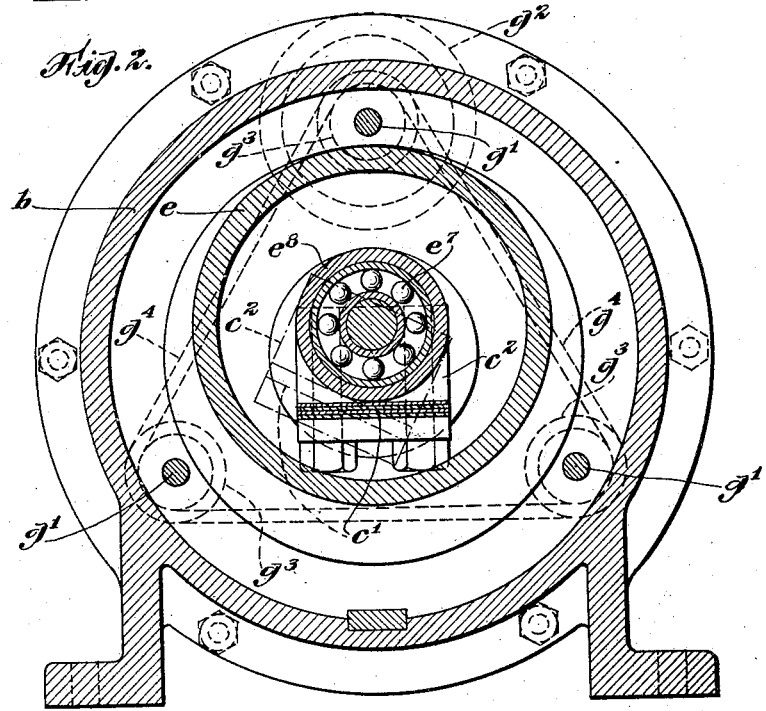

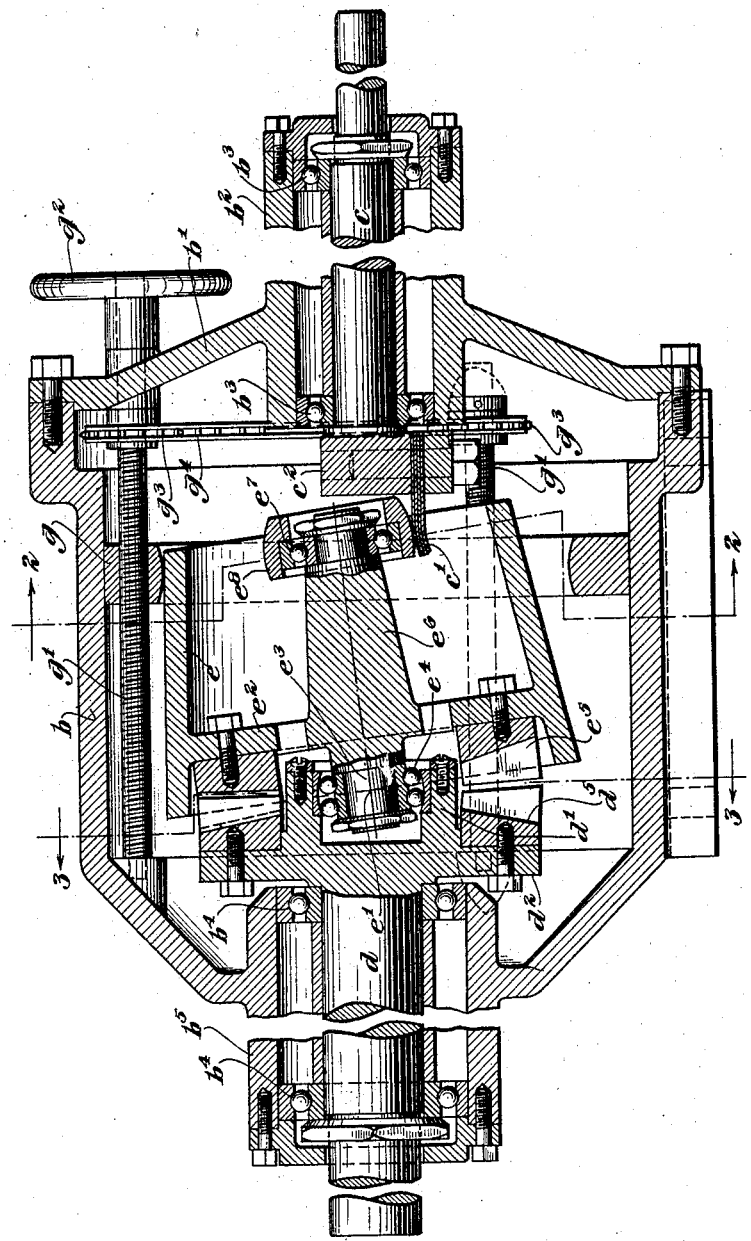

Patented July 29, 1930

1,771,807

UNITED STATES PATENT OFFICE

BENJAMIN A. MITCHELL, OF SALT LAKE CITY, UTAH

TRANSMISSION DEVICE

Application filed May 28, 1929. Serial No. 366,542.

In another application for Letters Patent of the United States filed April 19, 1928, Serial No. 271,139, there is described a variable speed transmission device in which power is transmitted from the driving member to the driven member through the operation of a gyratory member and in which the gyratory member is freely movable about its axis of gyration, in the manner of a gyratory pendulum, while the impeller, actuated by the driving shaft, acts resiliently upon the gyratory member, the contact member of the impeller being pressed by a spring in a radial direction against the gyratory member. In the practical operation of the transmission device shown and described in said application it has been found that there is considerable wear upon the roller of the impeller which is pressed against the gyratory member and also that there is considerable wear on the universal coupling between the gyratory member and the driven member, so that the universal coupling, constructed as shown and described in said application must be quite heavy in order to carry the load imposed on it.

The object of the present invention is primarily to overcome the operating difficulties referred to and to produce a transmission device which embodies the principle of construction of the former device but meets more satisfactorily the working conditions. The invention is illustrated in the accompanying drawings in which:

Figure 1 is a view in longitudinal, sectional elevation of a form of transmission in which the invention is embodied.

Figure 2 is a view of the same in transverse section on the plane indicated by the broken line 2—2 of Figure 1.

Figure 3 is a view of the same in transverse section on the plane indicated by the broken line 3—3 of Figure 1.

In the embodiment of the invention illustrated in the drawings the several working parts are supported by a housing which comprises a main and generally cylindrical portion $b$ and an end plate $b^1$, the latter being shown as having formed therewith a cylindrical extension $b^2$ of reduced diameter which supports, in suitable bearings $b^3$, the driving shaft $c$. The driven shaft $d$ is similarly supported by bearings $b^4$ in a cylindrical extension $b^5$, of reduced diameter, from the main housing $b$. A frusto-conical gyratory member $e$ is supported so as to have a free movement of gyration, in the manner of a gyratory pendulum, about its center of gyration, indicated at $e^1$. This gyratory member is preferably formed with a diaphragm $e^2$ from which projects centrally a stud $e^3$ which, for the support of the gyratory member, is received in a self-aligning, anti-friction bearing $e^4$ in a flange $d^1$ formed on the face of a transverse flange $d^2$ which is secured to or formed with the driven shaft $d$.

In the construction shown and described in said application Serial No. 271,139 the gyratory member is operatively connected with the driven shaft $d$ through a universal coupling, but it has been found desirable in the present instance to provide for such connection through annular beveled crown gears $d^5$ and $e^5$, secured respectively to the flange $d^2$ of the driven shaft $d$ and to the diaphragm $e^2$ of the gyratory member $e$. These annular gears have their teeth cut on the same pitch diameter so that the teeth will mesh properly as the gear $e^5$, in the gyratory movement of the member $e$, rolls upon the gear $d^5$, and rotation of the gyratory member about its own axis is transmitted to the driven shaft $d$.

In the construction shown in the application above mentioned the member $e$ derives its gyratory movement through the action of an impeller which is carried by the driving shaft and has a contact roller adapted for contact with a track formed on the inner surface of the shell of the gyratory member, the roller being held by resilient means in operative relation with the shell of the gyratory member. In the present construction, however, the gyratory member has projected centrally from the diaphragm $e^2$, on the opposed side from the stud $e^3$, a stud $e^6$ which has mounted at its end, through a suitable anti-friction bearing $e^7$, a roller $e^8$. The roller $e^8$ contacts with a leaf spring $c^1$ which is secured in a suitable head $c^2$ formed on or secured to the driving shaft $c$.

In the present case, as in the former case, the gyratory member $e$ contacts externally with a circular, circumscribing track $g$, being pressed against the track by the coaction of the spring $c^1$ with the roller $e^8$ on the stud $e^6$ of the gyratory member. For the purpose of effecting variation in speed between the driving member and the driven member of the transmission, the track $g$ is made adjustable in position longitudinally with respect to the center of gyration of the gyratory member. As shown, it is carried by three screws $g^1$, which may be actuated together through the medium of a hand-wheel $g^2$ on one of the screw shafts, sprocket wheels $g^3$ on the several shafts and a common sprocket chain $g^4$.

Assuming now that the driving shaft is rotated in a clockwise direction and that the impeller $c^1$, $c^2$ is carried with it in a clockwise direction, it will be understood that by reason of the lead which the spring $c^1$ has with respect to the point of contact of the roller $e^8$ against the gyratory member an over-turning movement will be exerted about the point of contact of the spring and the roller, which tends to flex the spring and also tends to increase as the point of contact of the spring with the roller moves beyond the radial line of the point of contact of the gyratory member with the coacting circular track $g$, which is held in a relatively fixed position, that is, against rotation in its own plane. In this manner the gyratory member will be caused to roll against the track $g$ and thereby to acquire a rotation about its own axis in a counter-clockwise direction, which rotation will be imparted, through the gears $d^5$, $e^5$, to the driven shaft $d$. The speed of rotation of the driven member will have the same ratio to the speed of rotation of the driving member as the ratio of the diameter of the relatively fixed circular track $g$ and the diameter of the gyratory member in the line of contact with the track. The speed ratio thus becomes variable through the shifting of the relatively fixed track $g$ in a longitudinal direction with respect to the axis of the gyratory member, the diameter of which increases from the right to the left in the construction shown.

I claim as my invention:

1. A transmission device comprising a driving member, a driven member, a fulcrumed, non-toothed gyratory member free to gyrate about its axis of gyration in the manner of a gyratory pendulum, a resilient impeller carried by the driving member in cooperative relation with the gyratory member, a relatively fixed non-toothed circular track for cooperation with the gyratory member, and gears carried in mesh with each other by the gyratory member and the driven member respectively.

2. A transmission device comprising a driving member, a driven member, a fulcrumed, non-toothed gyratory member free to gyrate about its axis of gyration in the manner of a gyratory pendulum, means whereby the rotation of the gyratory member about its own axis is transmitted to the driven member, a stud projected centrally from the gyratory member, an anti-frictional bearing on the stud, and an eccentric impeller carried by the driving member in contact externally with said bearing.

3. A transmission device comprising a driving memer, a driven member, a gyratory member free to gyrate about its axis of gyration in the manner of a gyratory pendulum, means whereby the rotation of the gyratory member about its own axis is transmitted to the driven member, a roller bearing stud projected centrally from the gyratory member, and a resilient impeller carried by the driving member in operative relation with said roller.

4. A transmission device comprising a driving member, a driven member, a gyratory member free to gyrate about its axis of gyration in the manner of a gyratory pendulum, means whereby the rotation of the gyratory member about its own axis is transmitted to the driven member, a roller bearing stud projected centrally from the gyratory member, and a leaf spring carried by the driving member in contact with said roller.

This specification signed this 23rd day of May, A. D. 1929.

BENJAMIN A. MITCHELL.